(12) United States Patent
Tsuruta et al.

(10) Patent No.: US 7,290,533 B2
(45) Date of Patent: Nov. 6, 2007

(54) SADDLE-RIDE TYPE VEHICLE

(75) Inventors: Yuichiro Tsuruta, Wako (JP); Toru Iwadate, Wako (JP); Yoshiaki Noda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/372,509

(22) Filed: Mar. 10, 2006

(65) Prior Publication Data

US 2006/0219221 A1  Oct. 5, 2006

(30) Foreign Application Priority Data

Mar. 31, 2005 (JP) .............................. 2005-101482

(51) Int. Cl.
*F02M 55/02* (2006.01)
*B60P 3/22* (2006.01)
(52) U.S. Cl. ....................... 123/509; 123/468; 280/833
(58) Field of Classification Search ................ 123/468, 123/469, 470, 509
See application file for complete search history.

(56) References Cited

U.S. PATENT DOCUMENTS

| 4,800,980 | A | * | 1/1989 | Hideo et al. ................. 180/225 |
| 4,964,483 | A | * | 10/1990 | Yokoyama et al. ......... 180/219 |
| 5,366,246 | A | * | 11/1994 | Chen et al. .................. 280/834 |
| 5,496,069 | A | * | 3/1996 | Milligan ...................... 280/830 |
| 5,924,393 | A | * | 7/1999 | Kikuchi .......................... 123/2 |
| 6,401,961 | B1 | * | 6/2002 | Butler .......................... 220/562 |
| 6,823,956 | B2 | * | 11/2004 | Shimizu .................... 180/68.1 |
| 2004/0168654 | A1 | * | 9/2004 | Radtke ............................ 123/2 |
| 2004/0200356 | A1 | * | 10/2004 | Kuperus ...................... 96/147 |
| 2006/0230728 | A1 | * | 10/2006 | Tsuruta et al. ............. 55/385.3 |
| 2007/0037423 | A1 | * | 2/2007 | Togawa ...................... 439/157 |

FOREIGN PATENT DOCUMENTS

JP         2003-72640         3/2003

* cited by examiner

*Primary Examiner*—Thomas Moulis
(74) *Attorney, Agent, or Firm*—Hamre, Schumann, Mueller & Larson, PC

(57) ABSTRACT

A saddle-ride type vehicle provided with an air cleaner at the rear side of an engine and a fuel tank at the upper side of the engine, and a heat shield panel disposed between the fuel tank and the engine. A fuel feed pipe, one end of which is connected to a fuel pump located at the front side of the engine, extends toward the upper part of the heat shield panel and is routed on the upper side of the heat shield panel and connected to an injector which forms a fuel intake. This improves the degree of freedom in the design around an engine and facilitates the layout of a fuel feed pipe that connects a fuel pump to a fuel intake at the front and rear of the engine so that the fuel feed pipe is hardly affected by the heat of the engine.

4 Claims, 2 Drawing Sheets

SADDLE-RIDE TYPE VEHICLE

FIELD

The present invention relates to a saddle-ride type vehicle, such as an ATV (All Terrain Vehicle); in particular to a saddle-ride type vehicle provided with an air cleaner disposed at the rear side of an engine attached to a vehicle body frame, and a fuel tank disposed at the upper side of the engine.

BACKGROUND

A saddle-ride type vehicle such as an ATV is generally provided with an engine nearly at the center of a vehicle body frame, a fuel tank at the upper side of the engine, and also a seat for a rider at the rear part of the fuel tank. In addition, an air cleaner of the inlet system of the engine is provided at the lower side of the seat and the ambient air having passed through the air cleaner is inhaled into the engine through a throttle body. Further, in the case of a vehicle provided with a fuel pump at the front side of the engine, a fuel feed pipe, one end of which is connected to the fuel pump, is routed on the upper side of the engine and connected to a fuel intake in the throttle body.

Further, in recent years, saddle-ride type vehicles have been provided with a heat shield panel between an engine and a fuel tank on the upper side thereof so as to prevent the heat of the engine from transferring to the side of the fuel tank. For example, see JP-A No. 72640/2003.

However, in such a conventional saddle-ride type vehicle, since a heat shield panel is disposed between an engine and a fuel tank at the upper side thereof, it is difficult to secure a space for piping and other parts on the upper side of the engine. Thereby, the space for installing a fuel feed pipe disposed astraddle the upper part of the engine in the anteroposterior direction of the vehicle body is largely restricted and a great amount of labor is required for the layout around the engine.

In addition, in a conventional saddle-ride type vehicle, when a fuel feed pipe is routed around an engine, some sort of a measure has to be taken in order to avoid the high heat of the engine and this also makes the design of the vehicle difficult.

In view of the above problems, it would be desirable to provide a saddle-ride type vehicle that improves the degree of freedom in the design around an engine by making it possible to facilitate the layout of a fuel feed pipe that connects a fuel pump to a fuel intake at the front and rear of the engine under a situation where the fuel feed pipe is hardly affected by the heat of the engine.

SUMMARY

A saddle-ride type vehicle provided with an air cleaner at the rear side of an engine attached to a vehicle body frame, a fuel tank at the upper side of the engine, and a heat shield panel between the engine and the fuel tank. A fuel pump is disposed on the engine side of the heat shield panel and supplies the fuel to a fuel intake of the engine. A fuel feed pipe has one end connected to the fuel pump, and the fuel feed pipe extends toward the fuel tank side of the heat shield panel. The fuel feed pipe is routed on the fuel tank side of the heat shield panel and connected to the fuel intake.

As a result, the fuel feed pipe is routed around the upper side part of the heat shield panel and is shielded from the heat of the engine, and is connected to the fuel intake nearer to the rear part of the vehicle body in relation to the engine.

In one embodiment, the fuel pump is connected to an injector of the fuel intake through the fuel feed pipe. In this case, the fuel is supplied to the injector through the fuel feed pipe without undergoing the heat of the engine and hence it becomes possible to realize high-accuracy fuel injection with the injector.

In another embodiment, a positioning fixture is provided to lock the fuel feed pipe on the upper face side of the heat shield panel. In this case, the fuel feed pipe is locked at a setting position on the upper face side of the heat shield panel with the positioning fixture and hence it becomes possible to easily connect the fuel feed pipe to the injector and also prevent unnecessary external force due to distortion of the fuel feed pipe or the like from affecting the injector.

In another embodiment, the heat shield panel is extended toward the rear side of the fuel tank and, at the trailing edge thereof, supports a snorkel on the upstream side of the air cleaner. In this case, it becomes possible to support the snorkel with the heat shield panel.

The fuel feed pipe is routed on the upper side of the heat shield panel to partition the fuel feed pipe from the engine and shield the heat of the engine from the fuel feed pipe. As a result, the degree of freedom in the design around the engine is improved without incurring the drawback of the adverse effect of the heat of the engine on the fuel feed pipe.

DETAILED DESCRIPTION

An embodiment of the present invention is hereinafter explained in reference to the drawings. In the explanations below, it is assumed that the directions of front, rear, right and left are in reference to the traveling direction of a vehicle unless otherwise specified. Further, the arrow FR in the figures shows the front direction of the vehicle, the arrow LH the left direction thereof, and the arrow UP the upper direction thereof, respectively.

Figure 1:
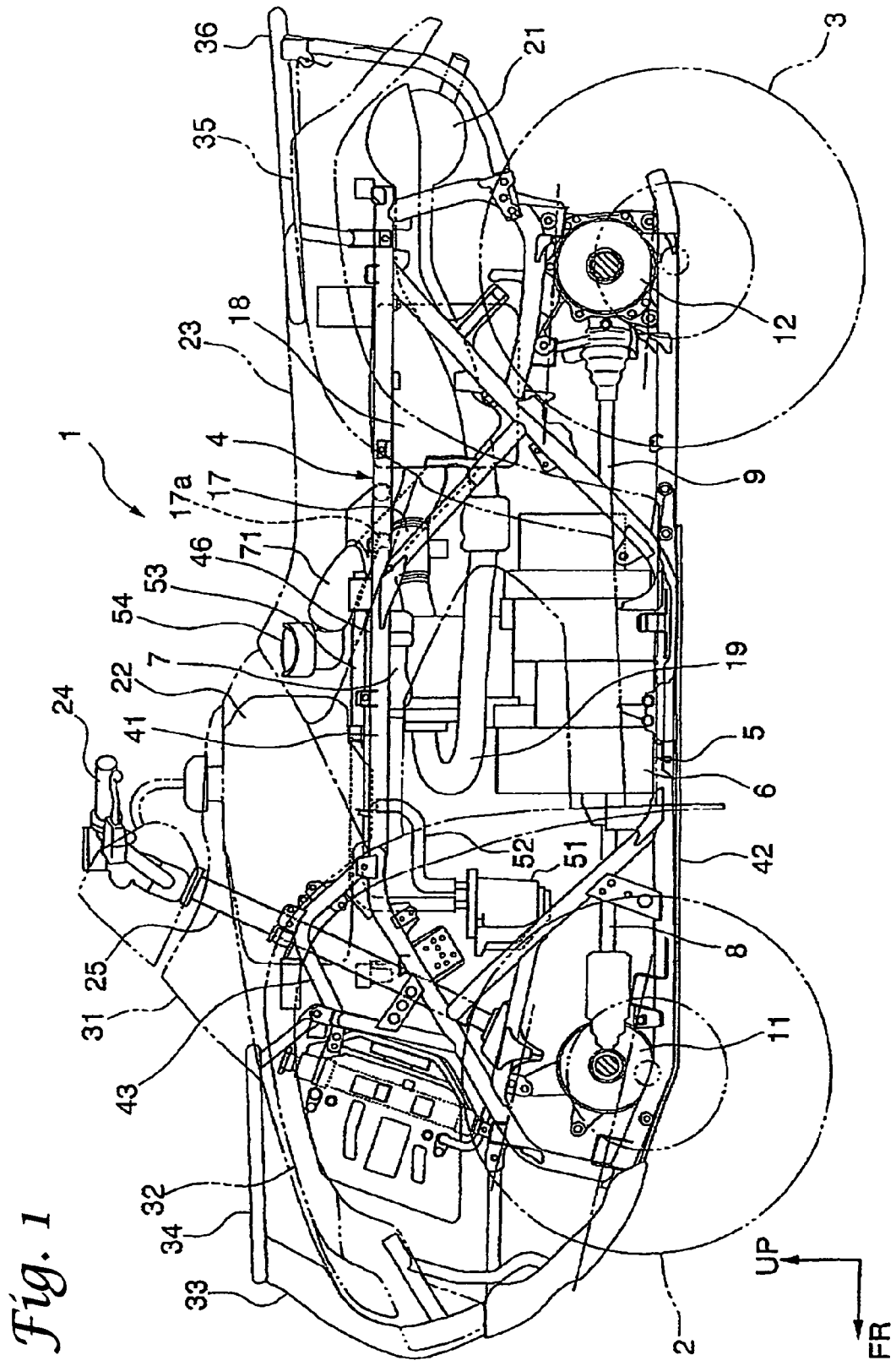
FIG. 1 is a side view centered on the skeleton section of a saddle-ride type vehicle of an embodiment according to the present invention.
Figure 2:
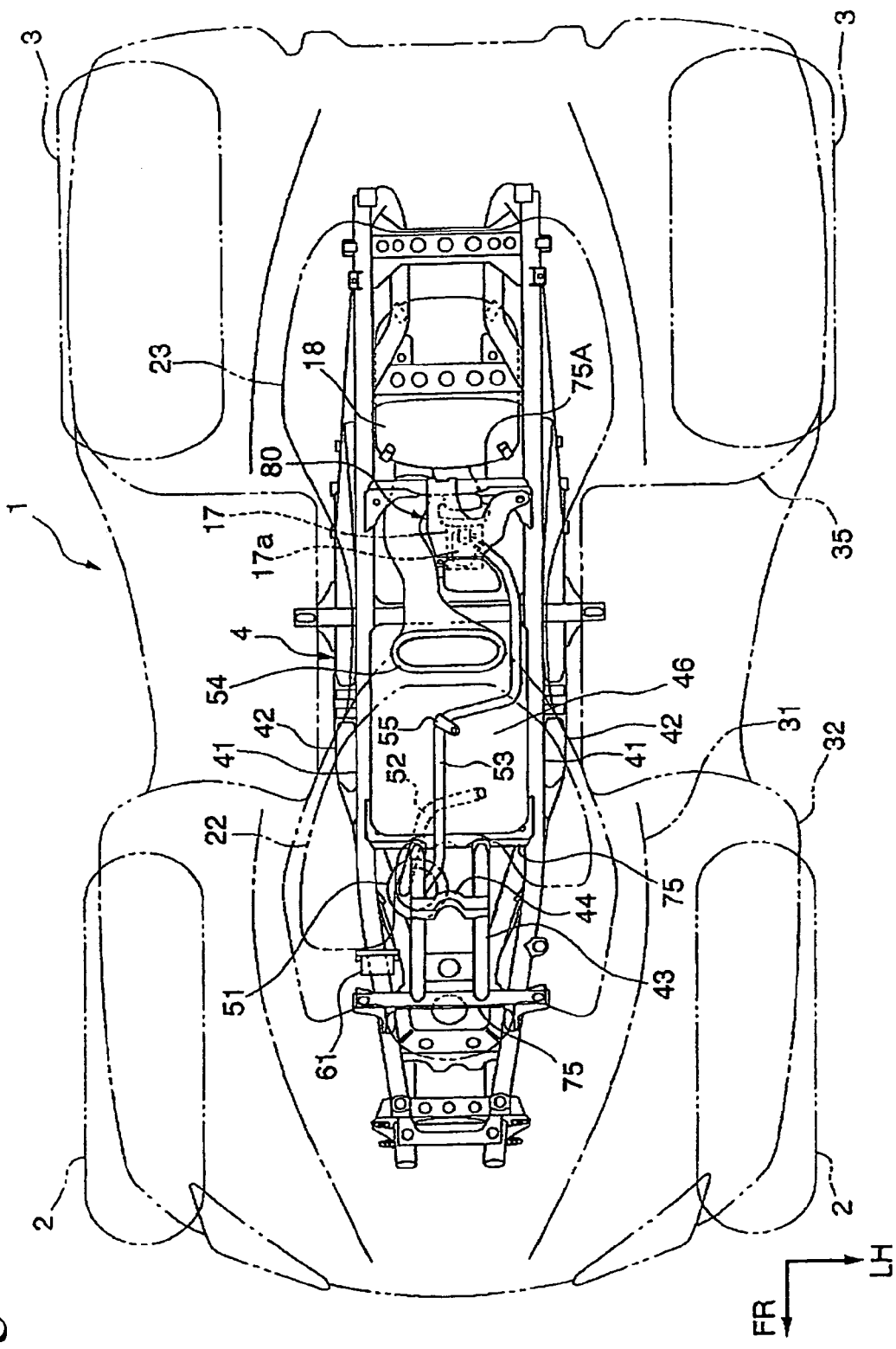
FIG. 2 is a plan view centered on the skeleton section of the saddle-ride type vehicle of the same embodiment.

With reference to FIGS. 1 and 2, a saddle-ride type vehicle 1 according to the present embodiment is a so-called ATV that: is equipped with low pressure balloon tires of a large diameter as front and rear wheels 2 and 3; secures a large minimum ground clearance; and thus has improved running performance mainly on a rough terrain.

An engine 5 is attached nearly at the center section of a vehicle body frame 4 on a longitudinal layout and is configured so that power is output to drive shafts 8 and 9 for the front and rear wheels, respectively, through transmissions not shown in the figures. The drive shafts 8 and 9 transfer the power to the front and rear wheels 2 and 3 through power distribution mechanisms 11 and 12, respectively. Here, in the case of the present embodiment, a crank case 6 forming the lower part of the engine 5 also has the function as a transmission case that contains the transmissions.

The vehicle body frame 4 is formed nearly into a box structure by a pair of upper pipes 41 and lower pipes 42, extending nearly in the anteroposterior directions of the vehicle body, on each of the right and left sides of the vehicle body. The pipes 41 and 42 are connected to each other, on the right and left sides of the vehicle body, with plural cross pipes (not shown by reference numerals).

The engine 5 is attached to the vehicle body frame 4 nearly in the center on the bottom side thereof and the part of a cylinder head 7 of the engine 5 is located at a position slightly lower than the upper pipes 41. An air cleaner 18 of an engine inlet system is attached to a part of the vehicle body frame 4 on the rear side of the engine 5 in relation to the vehicle body frame 4. The air cleaner 18 is connected to an intake on the rear side of the cylinder head 7 via a throttle body 17. Further, a snorkel 54 extends forward and obliquely upward at a position forming an offset, in the vehicle body width direction, to the throttle body 17 in front of the air cleaner 18 so as to introduce ambient air from the opening of the snorkel 54 at the front end thereof. Furthermore, an injector 17a as a fuel intake is integrally incorporated into the throttle body 17 so as to control the fuel supplied from a fuel pump 51 (which will be described later) with a controller (not shown in the figures) and eject the fuel into an intake path. Meanwhile, a base end of an exhaust pipe 19 is connected to the front portion of the cylinder head 7 and the exhaust pipe 19 extends forward, then bends rearward, and is connected to a silencer 21 at the rear side of the vehicle body.

A fuel tank 22 made of, for example, resin is disposed on the upper side of the engine 5 and, at the rear of the fuel tank 22, a saddle-ride type seat 23 is disposed in an openable and closable manner so as to cover the throttle body 17, the snorkel 54, the air cleaner 18 and other parts from above. A handle stem unit 43 is disposed at the part of the vehicle body frame 4 on the front side of the engine 5 and a steering shaft 25 is supported by the handle stem unit 43. A bar-shaped handle 24 is attached to the top end of the steering shaft 25 and a front wheel steering mechanism (not shown in the figures) is connected to the bottom end thereof. The front part of the fuel tank 22 curves generally in a U-shape in the manner of wrapping around the steering shaft 25 from both the sides thereof and thereby a sufficient capacity can be secured.

A fuel pump 51 is disposed under the fuel tank 22 so as to be located in front of the engine 5. A connecting pipe 52 extending downward from the fuel tank 22 is connected to the inlet of the fuel pump 51 and, to the exhaust port thereof, a fuel feed pipe 53 is connected to supply the ejected fuel to the injector 17a.

Meanwhile, a heat shield panel 46 is attached at a position immediately under the area extending from about the rear half part of the fuel tank 22 to the front part of the seat 23 in the manner of straddling the right and left upper pipes 41 and 41 of the vehicle body frame 4. The heat shield panel 46 forms a partition between the engine 5 and the fuel tank 22 and seat 23 above the engine 5. Therefore, the propagation of the high heat of the engine 5 to the fuel tank 22 and seat 23 is shielded.

The fuel feed pipe 53, one end of which is connected to the fuel pump 51, is extracted from the front end portion of the heat shield panel 46 toward the upper side (the side of the fuel tank 22) and laid along the upper face of the heat shield panel 46. The fuel feed pipe 53 bends on the upper face side of the heat shield panel 46 in the manner of forming a crank-shape (in a top view) in order to avoid the snorkel 54 extending from the air cleaner 18 toward the upper side of the heat shield panel 46 as shown in FIG. 2. The bent part of the fuel feed pipe 53 is locked to a setting position on the heat shield panel 46 with a cramp 55 as a positioning fixture.

Here, the fuel pump 51 and the injector 17a as the fuel intake are disposed on the lower side (the side of the engine 5) of the heat shield panel 46 interposing it in between.

A support piece 70 is installed in an extending manner at a position nearly in the center at the rear end part of the heat shield panel 46 and the snorkel 54 is connectedly supported by the support piece 70 with a bolt joint or the like. Further, at a position of the snorkel 54 somewhat closer to the vehicle body rear side than the junction with the support piece 70, a resonator 71 is disposed in a manner of being branched toward the left side of the vehicle body.

In the figures, the reference numeral 31 represents a vehicle body cover made of resin to cover the front part of the vehicle body including the fuel tank, and the reference numerals 32 and 35 represent a front fender and a rear fender, both made of resin, to cover the front wheels and the rear wheels, respectively. Further, the reference numerals 33 and 34 in FIG. 1 represent a front protector and a front carrier, and the reference numeral 36 represents a rear carrier.

As stated above, in the saddle-ride type vehicle 1, since the fuel feed pipe 53 connecting the fuel pump 51 at the front side of the engine 5 to the injector 17a at the rear side thereof is extracted toward the upper side of the heat shield panel 46, then laid along the upper face of the heat shield panel 46, and thereafter connected to the injector 17a, not only the heat of the engine 5 is shielded by the heat shield panel 46 and hardly affects the fuel feed pipe 53, but also the fuel feed pipe 53 can easily be laid without caring about the interference of the fuel feed pipe 53 with other engine parts. As a consequence, when such a saddle-ride type vehicle 1 is adopted, the fuel feed pipe 53 can be laid without caring about the influence of the heat of an engine and the interference with engine parts, and hence the degree of freedom in the design around the engine increases.

Although the fuel feed pipe 53 is described as being connected to the injector 17a in the case of the present embodiment, this can also be applied likewise to a vehicle that uses a carburetor for the fuel intake of an engine 5. However, in the case of a vehicle that employs an injector 17a at the fuel intake of an engine 5 like the present embodiment, fuel introduced into the injector 17a through a fuel feed pipe 53 is hardly affected by the heat of an engine and hence there is an advantage that more accurate fuel injection control can be realized.

Further, in the present embodiment, since the fuel feed pipe 53 routed along the upper face of the heat shield panel 46 is locked at a setting position on the heat shield panel 46 with a cramp 55, the piping work of the fuel feed pipe 53 is easy to do and moreover there is an advantage that backlash or distortion of the fuel feed pipe 53 can be prevented. By preventing such backlash or distortion of the fuel feed pipe 53, it becomes possible to further increase the control accuracy of the injector 17a.

In particular, in the case of fixing the vicinity of the bent part of the fuel feed pipe 53 to the heat shield panel 46 with the cramp 55 like the present embodiment, it is possible to efficiently suppress the backlash or distortion of the fuel feed pipe 53 in the anteroposterior or transverse direction.

Further, since the fuel feed pipe 53 is locked to the heat shield panel 46 with the cramp 55, there is an advantage that the positioning fixture can easily be set at an arbitrary position on the heat shield panel 46 in conformity with the shape of the fuel feed pipe 53.

Furthermore, in the present embodiment, since the support piece 70 is installed at the rear end of the heat shield panel 46 and the snorkel 54 is connected to the support piece 70 with a bolt joint or the like, there is an advantage that the snorkel 54 is securely supported by making use of the heat shield panel 46. In particular, in the case of the present embodiment, since the heat shield panel 46 is attached astride the right and left upper pipes 41 of the vehicle body frame 4 up to the rear end thereof, it is possible to support the snorkel 54 with high support rigidity.

The present invention is not limited to the above embodiment and various modifications of design are acceptable in the range not deviating from the tenor of the present invention. For example, though the fuel feed pipe 53 is locked on the upper face of the heat shield panel 46 with the cramp 55 in the above embodiment, it is also possible to lock the fuel feed pipe 53 to the heat shield panel 46 with a clip capable of holding it in between.

The invention claimed is:

1. A saddle-ride type vehicle, comprising:
   an engine attached to a vehicle body frame, an air cleaner positioned at the rear side of the engine, a fuel tank positioned at the upper side of said engine, and a heat shield panel between said engine and said fuel tank;
   a fuel pump disposed on the engine side of said heat shield panel and supplying fuel to a fuel intake of said engine; and
   a fuel feed pipe having one end connected to said fuel pump, said fuel feed pipe extending toward the fuel tank side of said heat shield panel and extending on said fuel tank side of said heat shield panel, and a second end of said fuel feed pipe is connected to said fuel intake.

2. A saddle-ride type vehicle according to claim 1, wherein said fuel intake includes an injector, and said fuel pump is connected to said injector through said fuel feed pipe.

3. A saddle-ride type vehicle according to claim 1, comprising a positioning fixture that connects said fuel feed pipe to an upper face side of said heat shield panel.

4. A saddle-ride type vehicle according to claim 1, wherein said heat shield panel extends toward a rear side of said fuel tank; and a snorkel is connected to said air cleaner, said snorkel being supported on the upstream side of said air cleaner adjacent a trailing edge of said heat shield panel.

* * * * *